Aug. 30, 1966  M. VON ARDENNE  3,269,173
APPARATUS FOR ULTRASONIC DIAGNOSIS
Filed March 2, 1962  3 Sheets-Sheet 1

INVENTOR
MANFRED V. ARDENNE
BY
ATTORNEY

INVENTOR
MANFRED V. ARDENNE

United States Patent Office

3,269,173
Patented August 30, 1966

3,269,173
APPARATUS FOR ULTRASONIC DIAGNOSIS
Manfred von Ardenne, Dresden-Weisser Hirsch, Germany, assignor to Veb. Transformatoren- und Rontgenwerk Dresden, Dresden, Germany
Filed Mar. 2, 1962, Ser. No. 177,063
4 Claims. (Cl. 73—67.9)

The present invention relates to an apparatus for ultrasonic diagnosis and, in particular, to such an apparatus where ultrasonic waves are used for echo sounding human tissues and the resulting echoes are separately recorded as to their travel time which corresponds to the depth at which they were reflected.

In my copending application Serial No. 177,062 filed on even date herewith and entitled, "Ultrasonic Diagnostic Testing Apparatus," an apparatus for ultrasonic medical diagnosis is disclosed. The principle of echo sounding is relied on. A spherical convergence type vibration transducer emits ultrasonic radiation which is concentrated onto a predetermined point of the tissue under investigation. A diaphragm with a small aperture is arranged in the focus of the transducer element and a lens is spaced a suitable distance from the diaphragm. The reflected ultrasonic pulse is converted into a voltage pulse of corresponding intensity and fed to an oscilloscope. The oscilloscope beam is deflected by a voltage synchronized with the pulse recurrence frequency to establish a time axis.

It has also been proposed to provide a mechanism for periodically guiding the scanning point along lines of the tissues to be examined. A relative displacement between the body and the ultrasonic apparatus results in the scanning of a two-dimensional area along parallel lines. The position of a writing spot in an image recorder is controlled in synchronism with the scanning point.

It is also known to coordinate the X and Y axes of a cathode-ray tube with the two coordinates of the scanned area, respectively, and to represent the intensities of the received echo as variations in the light output. If this known method is used with a double-focussing transducer, an echo image of the scanned area is obtained.

However, experiments have shown that if such a transducer, having a diaphragm inserted at the focus between the convergence type vibration transducer element and the convergent lens, is used, echoes are received which have been reflected from a three-dimensional layer of about 16 mm. thickness.

Hence, if an area is scanned line-by-line with this type of transducer, the resulting echo pulses are converted into voltage pulses and are displayed on an intensity-controlled cathode-ray tube, an echo image of the layer is obtained. However, a definite determination of the depth coordinate of the reflecting area within this layer is not possible with this system.

It is a principal object of the present invention to provide an echo image on the basis of ultrasonic sounding data which permits the determination of the depth or thickness of the three-dimensional area within the tissue from which the echoes have been reflected.

According to the invention, the electron beam of a cathode-ray tube is deflected along the X axis synchronously with the line-by-line motion of the ultrasonic ray focus along the tissue, as has been known. The echoes reflected at different depths of the tissue under investigation are spread along the Y axis of the cathode-ray tube screen in dependence of their respective travel times within the tissue.

Further objects and advantages will become apparent from the following description taken in conjunction with the figures, in which.

Figure 1:
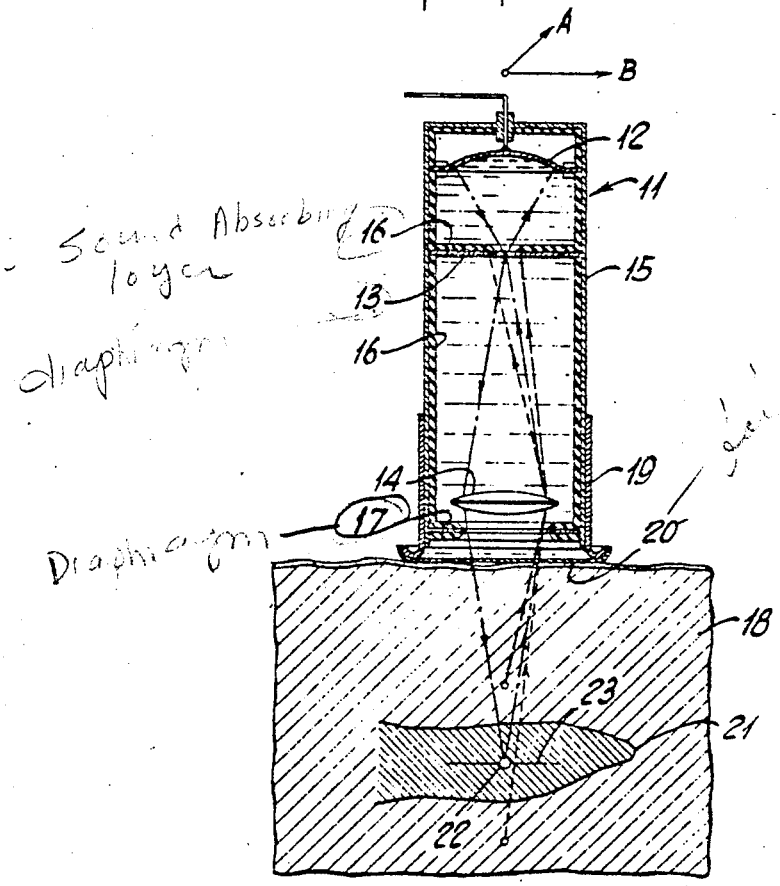
FIG. 1 is a somewhat schematic, sectional view of an ultrasonic transducer system according to the present invention.

Reference being now made to the figures, and first to FIG. 1, numeral 11 designates an ultrasonic transducer system or scanning head according to the present invention. System 11 comprises an ultrasonic transducer element 12, a diaphragm 13 and a convergence lens 14, both in the path of the ultrasonic waves. All elements are enclosed within a cylindrical housing 15 which is covered on its inside with a sound-absorbing layer 16, for instance moss-rubber. Diaphragm 13 is covered with a similar layer 16. To reduce distortions due to lens 14, a further diaphragm 17 with a large aperture is provided.

The ultrasonic transducer system 11 rests on the body or tissue 18 to be examined. A space, filled with liquid, is formed by a cylinder 19 which slidably engages housing 15 and a foil 20, establishing a path for the ultrasonic waves from the ultrasonic transducer system 11 to a medium 18. By axially shifting the cylinder 19 along housing 15, the image plane or layer within medium 18 can be displaced in the depth direction. A layer of oil or paraffin (not illustrated) between foil 20 and medium 18 improves the wave transmission. Medium 18 contains an organ 21 in which a stone 22 is situated. The focal plane is designated by the numeral 23.

Figure 2:
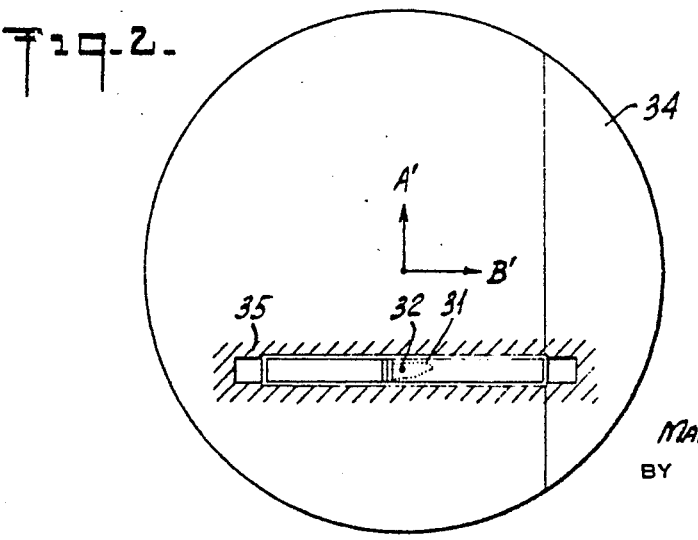
FIG. 2 represents the screen of a cathode-ray tube displaying an image formed by the diagnostic apparatus according to the present invention.
Figure 3:
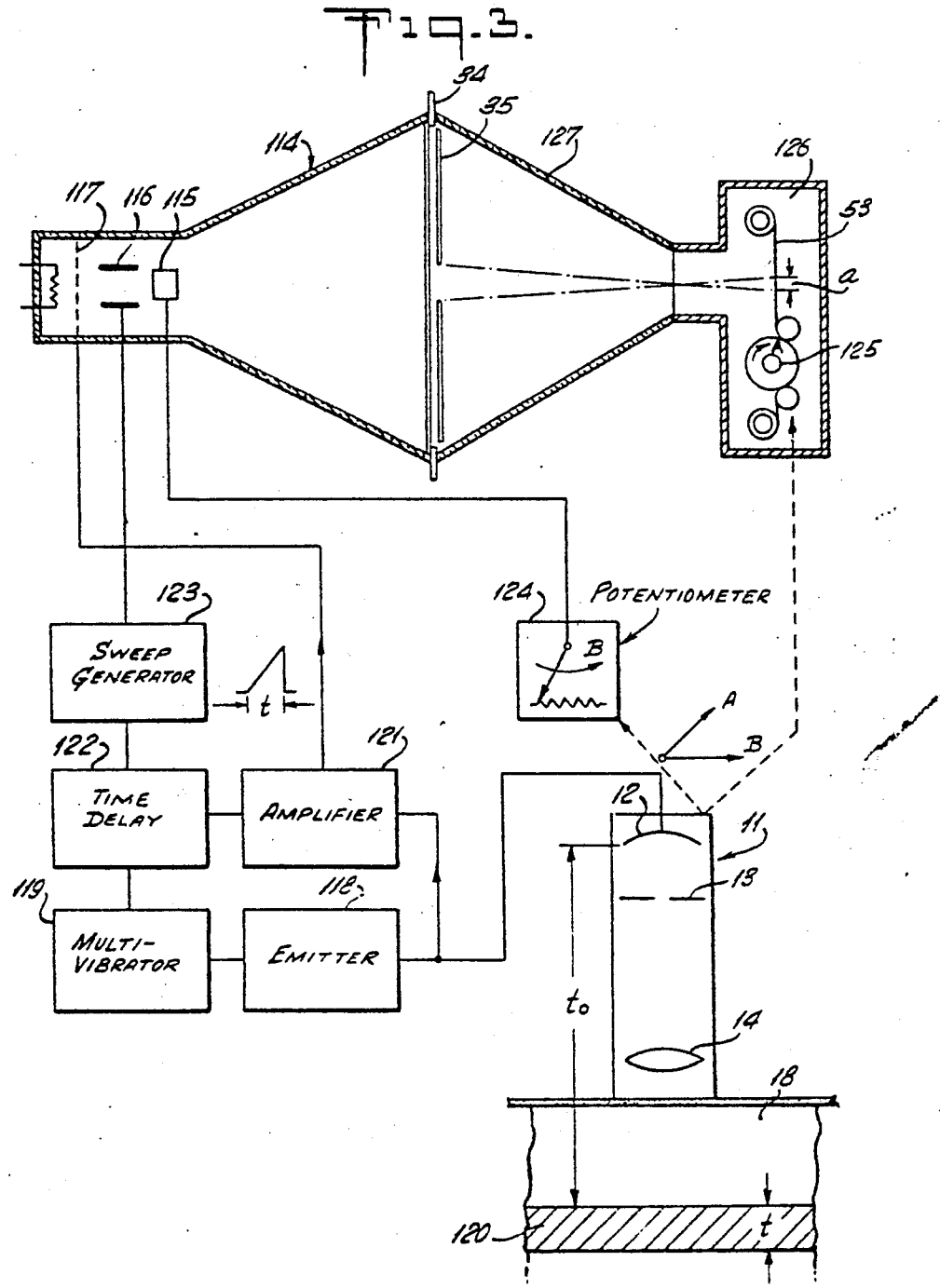
FIG. 3 is a block diagram illustrating the operative connection of the ultrasonic diagnostic apparatus according to the invention.

In FIG. 2, the numeral 34 designates a fluorescent screen of a cathode-ray tube 114 (see description of FIG. 3). A masking slot or diaphragm 35 corresponds in its length to that of a line scanned along the tissue, for instance 150 mm., of the echo image to be recorded. The width of masking slot 35 is proportional to the thickness of the layer in the depth direction from which echoes are received. The numeral 31 indicates the outline of the organ 21 and the numeral 32 that of stone 22.

Masking slot 35 is imaged onto a film or the like medium by an optical system where it is recorded at a suitable scale. The film is advanced in the direction of the arrow A' by the width of the image of masking slot 35 each time a new line is scanned. Details of the electronic circuitry used in an exemplary embodiment of the inventive apparatus will be given in connection with FIG. 3, to be described somewhat later.

As the ultrasonic transducer system 11 is displaced in a line scanning motion along the surface of medium 18 in the direction indicated by the arrow B in FIG. 1, the oscilloscope beam is synchronously deflected in the direction of the X-axis, indicated by an arrow B' in FIG. 2. After completion of the scanning of one line, the transducer system 11 is shifted by the width of a line in the direction of the arrow A in FIG. 1. Simultaneously, the film is shifted by the width of the image produced by slot 35 in the direction indicated by the arrow A' in FIG. 2, and a second line is scanned by the system 11.

The echoes received from objects located at different depths within medium 18 are recorded at different distances along the Y-axis of the cathode-ray screen, depending on the time required by the ultrasonic wave to reach the respective reflecting object and to return. The echoes are recorded in a light-dark representation. Further details of the inventive echo recording will appear somewhat later in the specification, in connection with a phantom incorporating, as a matter of example, a body the existence of which is established, line by line, as will appear in full detail with reference to FIGS. 4 through 6.

In FIG. 3, numeral 114 designates the afore-mentioned cathode-ray tube. A pair of horizontal deflection plates is designated 115, while 116 is a plate pair for vertical beam deflection. A grid 117 is used for the brightness modulation of the beam or rather the light spot appearing on the fluorescent screen 34.

The ultrasonic transducer or scanning head 11, already shown in FIG. 1, and which is placed on the body 18 to be examined, is excited by an emitter 118 energized by a multivibrator 119. The body or tissue 18 has therein a layer 120 to be scanned, corresponding in a way to organ 21 including a stone 22, as shown in FIG. 1. The distance between layer 120 and the transducer element 12 proper is $t_0/2$, the thickness of the layer is $t/2$. The echoes received from layer 120 are fed into an amplifier 121 and thence to the cathode-ray tube grid 117 for the purpose of brightness modulation. The multivibrator 119 also provides a pulse for a time-delay stage 122 set to the time unit $t_0$. The last-named stage provides a pulse which triggers a sweep generator 123 producing a sawtooth voltage with a time factor $t$. This voltage is fed, as shown in the circuit of FIG. 3, to the plate pair 116.

The movement of the system 11 in the direction indicated by the arrow B (both FIGS. 1 and 3) influences a potentiometer 124, as schematically shown by an interconnecting broken line; the potentiometer provides the control voltage of the plate pair 115.

When scanning is performed from one line to another, i.e., when the transducer system 11 moves in the direction of arrow A, a film advance mechanism 125 of a camera 126 is actuated in such a way that a film strip 53 (see also FIG. 6) is advanced by a distance corresponding at least to the defined width $a$. The schematic illustration of FIG. 3 shows how this width is the function of the masking-slot 35 (also appearing in FIG. 2). The camera 126 is attached in a light-tight manner to screen 34 of the cathode-ray tube 114 with the aid of a hood 127.

The slotted diaphragm or masking slot 35 is built into the hood 127, its slot being oriented longitudinally, the length of the slot corresponding to the length of a scanned line, i.e., to the distance covered by the transducer system 11 in the direction B. The directions A', B' corresponding to the afore-mentioned directions of movement A, B, respectively, of system 11 have been explained hereinabove with reference to FIG. 2. The width of slot 35 corresponds to the thickness of layer 120 and to the deflection of the cathode-ray beam by the sawtooth path of sweep generator 123, in the Y-axis.

The inventive apparatus, in the exemplary embodiment here described, works as follows: When transducer system 11 is moved in the direction B for the purpose of scanning a chosen line in body 18, potentiometer 124 is simultaneously influenced. This has the effect of deflecting the cathode beam in the longitudinal direction of diaphragm 35. Consequently, each point on the scanned line is correlated to a particular point on the X-axis of the cathode-ray tube.

Upon having scanned a line, the system 11 is moved in the direction A by a line's width, whereby the film 53 in camera 126 is simultaneously advanced by distance $a$. This results in a separate record being made for each individual line. The emitter 118 feeds high-frequency pulses of one microsecond duration and approximately 3 megacycles per second carrier frequency to the oscillator 11. The pulse frequency is determined by multivibrator 119 and measures, as a matter of example, one kilocycle per second.

The echoes received in the system 11–17 (of which only elements 12, 13 and 14 have been shown schematically in FIG. 3, while the complete system is illustrated in FIG. 1) are amplified in stage 121. However, since this amplifier stage is influenced by the time-delay stage 122 in such a way that it only amplifies echoes emanating from layer 120, and the time-delay stage in turn controls sweep generator 123 to deflect the beam in the Y-axis, it is assured that the light spot is shifted along the Y-axis within the slot of diaphragm 35 by a distance depending on the depth of the reflecting spot within layer 120. It should be pointed out that the generated saw-tooth voltage starts after the time limit $t_0$ has elapsed, and reaches is highest value upon the expiration of the time $t_0+t$.

The mode of operation of the inventive arrangement will be explained hereafter with the aid of FIGS. 4–6, using, by way of example, a geometrically simple object or body.

Figure 4:
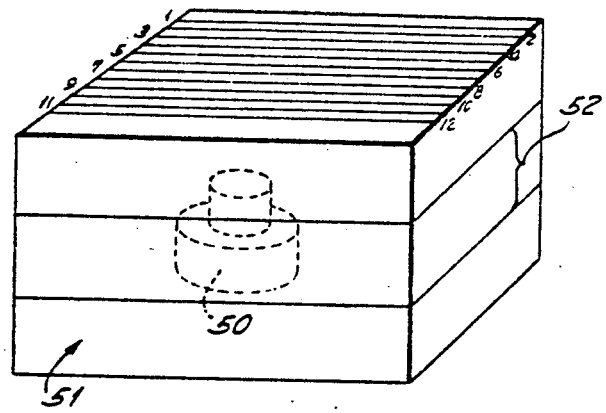
FIGS. 4 and 5 are a perspective and a top plan view, respectively, of a phantom including a body to be diagnosed with the inventive apparatus, as a matter of explanatory example.
Figure 5:
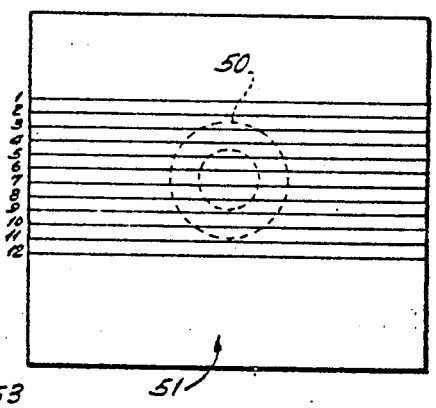

Referring now to FIG. 4, numeral 50 designates a body positioned within a phantom 51; the position and dimensions of the body are to be determined. The volume to be examined is first subdivided into zones of approximately 15 to 20 millimeters thickness. For the sake of reference, these are designated 1 through 12 in FIGS. 4 and 5. The oscillator system 11 is guided line-by-line over the phantom 51. The present example describes the examination of a layer thickness or zone 52 in which the body 50 happens to lie. The surface to be diagnosed—in this case the top surface of the phantom—appears in FIG. 5 with the twelve equidistant scanning lines.

Figure 6:
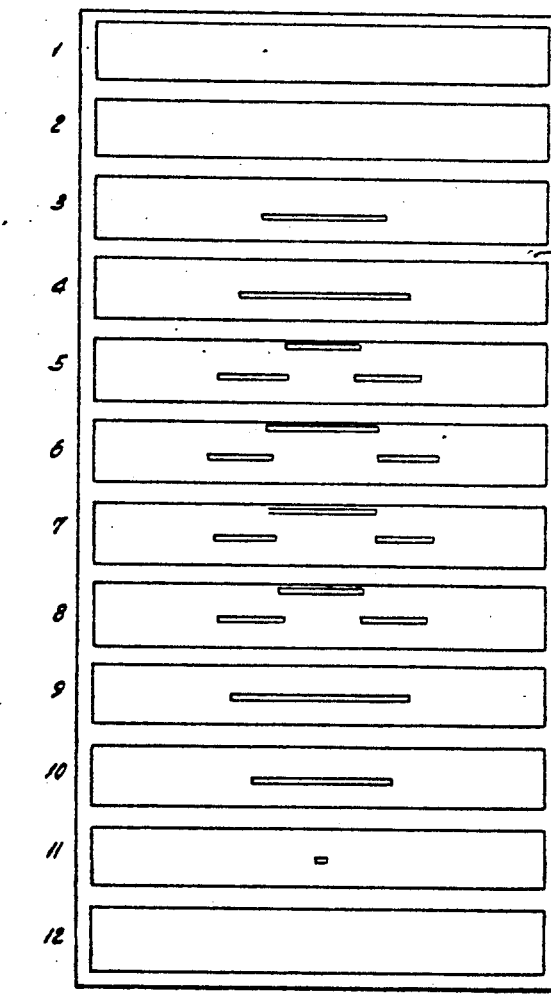
FIG. 6 is a film strip on which an echo image has been recorded, line by line, from the phantom illustrated in FIGS. 4 and 5.

FIG. 6 shows the total length of film 53 produced during the scanning of phantom 51. One of the twelve picture portions, similarly identified by numerals 1 to 12, is exposed for each scanning line. Film portion 1 corresponds to scanned line 1, portion 2 to line 2, and so on. FIG. 5, showing the relative positions of the scanning lines to the body 50, facilitates understanding the information recorded on film 53.

It is easily understood that during the scanning of lines 1 and 2, no echos are received from zone 52, in the absence of any non-homogeneous reflecting tissues beneath these lines in that zone. Thus, film portions 1 and 2 will remain unexposed. When scanning line 3 (observe FIG. 5), body 50 comes for the first time within the range of the ultrasonic beam; consequently, echoes will be received from the lower portion of zone 52, which will leave a trace in the lower part of film portion 3. The length of the trace corresponds to the chord formed by the intersection of line 3 with the body 50. The position of the trace on the partial record 3 of film 53 is determined, of course, by the position of body 50 within layer 52 beneath scanning line 3. When line 5 is scanned, echoes from that part of the body which is closed to the oscillator (greatest elevation) are picked up, resulting in exposure of the upper part of film section 5. In the partial record 5, three separate broken-up traces are recorded, the intermediate one representing the extension of the narrower, elevated body portion while the two lateral traces correspond to the lower, protruding reflecting body portions.

In order to obtain a film record as shown in FIG. 6, care must be taken to move the film 53 by distances corresponding to at least one width of a film portion when transferring the scanning from one line to the next one, and to keep this distance uniform at all times. In connection with the embodiment of FIG. 3, the film advance mechanism 125 has been explained, with the control function of system 11, as the scanning goes on.

The record appearing on the film of FIG. 6 has a rich information contents inasmuch as it represents not only an ultrasonic image of a particular layer but permits a resolution of this layer into a great number of intermediate layers. In practice, the record contains, after resolution, some ten different echo images, each corresponding to a different depth within the scanned layer 52.

Recording the record portions is best done in the following manner. A camera equipped with a standard lens, which would assure that the film 53 is always moved by the same distance, in dependence on its width, is attached to the cathode-ray tube screen 34 in a light-tight manner. Besides the slot diaphragm 35 oriented in the X-axis, and described hereinabove for FIG. 3, a masking means may be inserted between the camera lens and the luminous screen 34. The shield or mask is given the dimensions of the record portion to be obtained on the film.

The subject matter of the present invention is not limited to the use of a double-focussing system as described in the aforementioned co-pending application Ser. No. 177,062. It is also possible to use a simply focussing transducer, e.g., as shown in FIG. 2 of U.S. Patent 2,913,602 to Ivan L. Joy. Use can likewise be made of a transducer generating a parallel bundle of rays. Drawbacks associated with these systems will become apparent, however; for example, echoes emanating from unwanted regions or layers will be recorded, as a result of multiple reflections.

One of the major advantages of the invention consists in that the echo images are obtained with a single scanning operation. As has been pointed out before, the inventive scanning system is not limited to the use of the transducer system 11 disclosed herein.

The advantages inherent in the invention become apparent only when taking into account the fact that the film record 53, as shown in FIG. 6, can be evaluated in a manner leading to an unexpected result, as has been fully disclosed in the co-pending patent application of even date, Ser. No. 177,064, entitled "Display Device for Spaced Apart Partial Images," now U.S. Patent 3,198,060, issued August 3, 1965. Care must be taken with an apparatus of this kind to be able optically to combine correlated zones or parts of the individual picture portions in such a way as to obtain an echo image of the given zone. It will be understood in connection with FIG. 4, for instance, that the echoes returned from the top, center or bottom part of zone 52 may be combined into a complete record, corresponding in FIG. 6 to appropriate top-edge, center or lower-edge sections within each of the scanned picture portions 1 through 12.

If, in accordance with the above-mentioned Patent 3,198,060, an arrangement is provided which makes possible a continuous blending of the zone sections into each other during examination, it is clear that a simple means of evaluation, coupled with precise determination of depth co-ordinates is afforded. The information contents of a record so obtained is of a very high order since the brightness of the light spot is adjusted in dependence on the intensity of the reflected and recorded echoes. The zonal echo images obtained not only indicate the position of non-homogeneous formation in the body but also permit conclusions to be drawn as to their nature.

The apparatus according to the present invention considerably increases the information contents of the echo image compared to prior art methods, and the location of the reflecting object in the direction of the ultrasonic beam is accurately determined.

It is intended that all matter contained in the above description or shown in the accompanying drawings shall be interpreted as illustrative and not in a limiting sense.

What is claimed is:

1. An apparatus for examining predetermined depth layers of human tissues and the like, comprising an ultrasonic transducer for transmitting directional pulses and receiving the echoes arising from the reflection of said pulses, a cathode-ray tube having a beam-intensity control grid and two deflection systems for deflecting the beam in first and second directions, respective first and second control means for said first and said second deflection systems, said first control means being synchronized with said pulses transmitted by said transducer, the received echoes being applied to said control grid, scanning means for displacing said transducer along a predetermined path, said scanning means covering a predetermined area of said tissue along a line-by-line path, said second control means being synchronized with the line-scanning motion, recorder means for photographing the screen of said cathode-ray tube unto a medium, means for advancing said medium by a predetermined distance at the completion of each line-scanning motion, and a masking slot in front of said cathode-ray tube, wherein the dimension of said slot corresponds, in the direction of said first deflection, to the width of said depth layer of tissue in the direction of propagation of said pulses, while the dimension of said slot in the direction of said second deflection corresponds to the length of a scanned line.

2. An apparatus for examining predetermined three-dimensional depth layers of human tissues and the like, comprising an ultrasonic transducer adapted to be placed in close proximity to the surface of said tissue, for transmitting directional pulses into said tissue and receiving the echoes arising from the reflection of said pulses in said depth layers, the main extension of said depth layers being substantially perpendicular to the main line of propagation of said pulses, a cathode-ray tube having a beam-intensity control grid and two deflection systems for deflecting the beam in first and second directions, respective first and second control means for said first and said second deflection systems, said first control means being synchronized with said pulses transmitted by said transducer, the received echoes being applied to said control grid, scanning means for alternately displacing said transducer in substantially perpendicular first and second directions, the former for performing a point-by-point linear scanning motion on said surface of the tissue, and the latter for shifting said transducer by the width of a scanned line, said second control means being synchronized with the displacement of said transducer in said first direction, and means for blocking out unwanted echoes arising from the reflection of said pulses in other than said predetermined depth layers.

3. An apparatus as defined in claim 2, wherein said scanning means covers a predetermined two-dimensional area of said tissue as a result of the displacements of said transducer in said first and said second directions, and said second control means is synchronized with the displacement of said transducer in said first direction, further comprising recorder means for photographing the screen of said cathode-ray tube unto a medium, and means for advancing said medium by a predetermined distance simultaneously with the displacement of said transducer in said second direction, said first control means including means for spreading said echoes in said first direction of deflection in dependence of their travel time from said predetermined depth layers to said transducer.

4. An apparatus as defined in claim 2, wherein said transducer includes a spherical convergence transducer element, a diaphragm having a small aperture at the focal point of said transducer element, and a convergence lens spaced from said diaphragm along said main line of propagation of the pulses, said diaphragm and said lens constituting said blocking means.

References Cited by the Examiner

UNITED STATES PATENTS

| | | | |
|---|---|---|---|
| 2,763,153 | 9/1956 | Simjian | 73—67.8 |
| 2,913,602 | 11/1959 | Joy | 310—8.3 |
| 2,984,098 | 5/1961 | Loos | 73—67.9 |
| 3,023,611 | 3/1962 | Howry | 73—67.8 |

OTHER REFERENCES

Kikuchi et al.: "Early Cancer Diagnosis Through Ultrasonics," The Journal of the Acoustical Society of America, volume 29, No. 7, July 1957, pages 824–833.

Periodical, The Lancet, article by Donald et al. entitled "Investigations of Abdominal Masses of Pulsed Ultrasound," June 7, 1958, issue, pages 1188–1195.

RICHARD C. QUEISSER, *Primary Examiner.*

JOHN P. BEAUCHAMP, C. A. RUEHL,
*Assistant Examiners.*